(12) United States Patent
Sullivan et al.

(10) Patent No.: US 11,833,955 B1
(45) Date of Patent: Dec. 5, 2023

(54) MODULAR BED AND SEAT SYSTEM FOR A REAR CARGO AREA OF A VEHICLE

(71) Applicants: Royce Sullivan, Temecula, CA (US); Jerry Sullivan, Temecula, CA (US)

(72) Inventors: Royce Sullivan, Temecula, CA (US); Jerry Sullivan, Temecula, CA (US)

(*) Notice: Subject to any disclaimer, the term of this patent is extended or adjusted under 35 U.S.C. 154(b) by 0 days.

(21) Appl. No.: 18/219,659

(22) Filed: Jul. 8, 2023

Related U.S. Application Data

(60) Provisional application No. 63/359,827, filed on Jul. 9, 2022.

(51) Int. Cl.
*B60P 3/39* (2006.01)
*B60N 2/34* (2006.01)

(52) U.S. Cl.
CPC . *B60P 3/39* (2013.01); *B60N 2/34* (2013.01)

(58) Field of Classification Search
CPC .......... B60N 3/2047; B60N 3/008; B60P 3/39
See application file for complete search history.

(56) References Cited

U.S. PATENT DOCUMENTS

| | | |
|---|---|---|
| 3,181,911 A | 5/1965 | Peras |
| 3,246,347 A | 4/1966 | Mason |
| 3,570,025 A | 3/1971 | Sullivan |
| 3,604,022 A | 9/1971 | Smith |
| 3,946,678 A | 3/1976 | Birge, II |
| 4,005,898 A | 2/1977 | Way |
| 4,190,911 A | 3/1980 | Wadsworth |
| 4,199,188 A | 4/1980 | Albrecht |
| 4,200,329 A | 4/1980 | Inami |
| 4,231,144 A | 11/1980 | Bernacchia, Jr. |
| 4,505,509 A | 3/1985 | Simeri |
| 4,573,225 A | 3/1986 | Wolf |
| 4,779,917 A | 10/1988 | Campbell |
| 5,452,972 A | 9/1995 | Adams |
| 5,967,054 A | 10/1999 | Rosenfeld |
| 6,270,137 B1 | 8/2001 | Minix |
| 6,733,060 B1* | 5/2004 | Pavkov .................... B60R 7/02 224/543 |
| 9,004,567 B2 | 4/2015 | Gerhardt |
| 10,118,559 B2 | 11/2018 | Dhillon |

(Continued)

FOREIGN PATENT DOCUMENTS

| | | | |
|---|---|---|---|
| DE | 102013006515 A1 * | 10/2013 | ........... B60N 2/3095 |
| EP | 1867522 | * 12/2007 | |

*Primary Examiner* — Joseph D. Pape
(74) *Attorney, Agent, or Firm* — QUICKPATENTS, LLC; Kevin Prince

(57) ABSTRACT

A modular bed and seat system for use in a vehicle having a rear cargo area includes a pair of side boxes, a front side thereof having at least one extension rail aperture. Each side box contains at least one extension rail movable from a retracted position to an extended position partially extending out of one of the extension rail apertures. Each extension rail and an inner side of each side box include at least two mounting apertures. A plurality of support panels each include rigid mounting prongs adapted for engaging the mounting apertures. In use, with the side boxes mounted to the two side walls of the rear cargo area of the vehicle, and with the extension rails set to desired positions, each support panel is placed to engage with the mounting apertures on either. As such, a variety of support panel configurations is achievable.

8 Claims, 6 Drawing Sheets

(56) References Cited

U.S. PATENT DOCUMENTS

| | | |
|---|---|---|
| 10,421,407 B2 | 9/2019 | Hughes |
| 10,913,398 B2 | 2/2021 | Hanley |
| 11,419,427 B2 * | 8/2022 | Niemela ................. F16B 12/28 |
| D972,483 S | 12/2022 | Sullivan et al. |
| 11,607,051 B2 * | 3/2023 | Natuzzi .................. A47B 83/04 |
| 2006/0180623 A1 | 8/2006 | Reynolds |
| 2019/0126836 A1 | 5/2019 | Navarro |
| 2020/0070730 A1 | 3/2020 | Gill |
| 2020/0114802 A1 | 4/2020 | Laguana |
| 2021/0070214 A1 | 3/2021 | Hoedl |
| 2021/0146844 A1 | 5/2021 | Smith |

* cited by examiner

MODULAR BED AND SEAT SYSTEM FOR A REAR CARGO AREA OF A VEHICLE

CROSS-REFERENCE TO RELATED APPLICATIONS

This application claims the benefit of U.S. Provisional Patent Application 63/359,827, filed on Jul. 9, 2022, and is incorporated herein by reference.

STATEMENT REGARDING FEDERALLY SPONSORED RESEARCH AND DEVELOPMENT

Not Applicable.

FIELD OF THE INVENTION

This invention relates to vehicle accessories, and more particularly to a modular bed and seat system for a cargo area of a vehicle.

BACKGROUND

The rear cargo area of vans, SUVs, and trucks are often underutilized. Users of such vehicles frequently desire to sit or sleep in the vehicle, but existing solutions make reconfiguration of the cargo area difficult and impractical. It is often desirable to have a place to sleep, to sit, to eat, and to have storage for water and other necessities.

Therefore, there is a need for a modular bed and seat system that can be easily changed into different configurations for sleeping, sitting, eating, or the like. Such a needed invention would itself be compact when not in use, and would allow for the storage of water or other liquids. Such a needed system would be easy to install in and remove from the vehicle, and would be durable particularly when reconfigured frequently. The present invention accomplishes these objectives.

SUMMARY OF THE INVENTION

The present device is a modular bed and seat system for use in a vehicle of the type having a rear cargo area that includes at least two side walls and a floor. The modular bed and seat system includes a pair of side boxes that each have a front side, a rear side, an inner side, an outer side, a top side, and a bottom side, all defining an internal volume therein. The front side has at least one extension rail aperture. Each side box contains at least one extension rail movable from a retracted position within the internal volume of the side box, to an extended position partially extending out of one of the at least one extension rail apertures. Each extension rail includes at least two mounting apertures on an inner surface thereof. The inner side of each side box also includes at least two of the mounting apertures.

The modular bed and seat system further includes a plurality of support panels that each include a first piece telescopingly affixed with a second piece. The first piece and the second piece, when mutually engaged, form the support panel that includes a top side, a bottom side, a front side, a rear side, and two opposing lateral sides. A spring mechanism urges the two opposing lateral sides away from each other by urging the first piece away from the second piece.

Two rigid mounting prongs project laterally away from each lateral side and are each adapted for engaging one of the mounting apertures on either the inner side of one of the side boxes, or the mounting apertures on the inner surface of one of the extension rails. In use, with the side boxes mounted one each to the two side walls of the rear cargo area of the vehicle, and with the extension rails set to desired positions, each support panel is compressed to allow the mounting prongs of the support panel to engage with the mounting apertures on either the inner side of one of the side boxes or the mounting apertures on the inner surface of one of the extension rails. When released, the spring mechanism urges the mounting prongs into the mounting apertures to secure the support panel to the side boxes.

In preferred embodiments the inner side of each side box further includes at least one mounting slot adapted to slidably receive one of the mounting prongs of one of the support panels. The mounting slot may be a horizontal mounting slot, a slanted mounting slot, or a vertical mounting slot. As such, the position of the support panel with respect to the side boxes is partially adjustable. The mounting apertures of the side boxes may be positioned so that each support panel may be oriented horizontally, or on a slant, or vertically, as may be desired by a user of the system.

Preferably the modular bed and seat system further includes at least two tanks adapted for fixing between the outer side of each side box and the rear cargo area of the vehicle. Such tanks are adapted for holding a liquid, such as water, and include any necessary manually-actuated spigots, air check valves, and the like as is known in the art. A width of the tanks may be customized so that the modular bed and seat system just fits between the two side walls of the rear cargo area. In some embodiments, build boxes are included as an extension to the water tanks, and may be used for storage, as sizing spacers between the two side walls of the rear cargo area and the side boxes, and/or include plumbing, pumps, batteries, or other components for accessing water stored in the water tanks. Such build boxes may include removable top sides to facilitate access to an internal space within the build boxes.

The present invention is a modular bed and seat system that can be easily changed into different configurations for sleeping, sitting, eating, or the like. The present invention is itself compact when not in use, and allows for the storage of water or other liquids. The present system is easy to install in and remove from the vehicle, and is durable even if reconfigured frequently. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
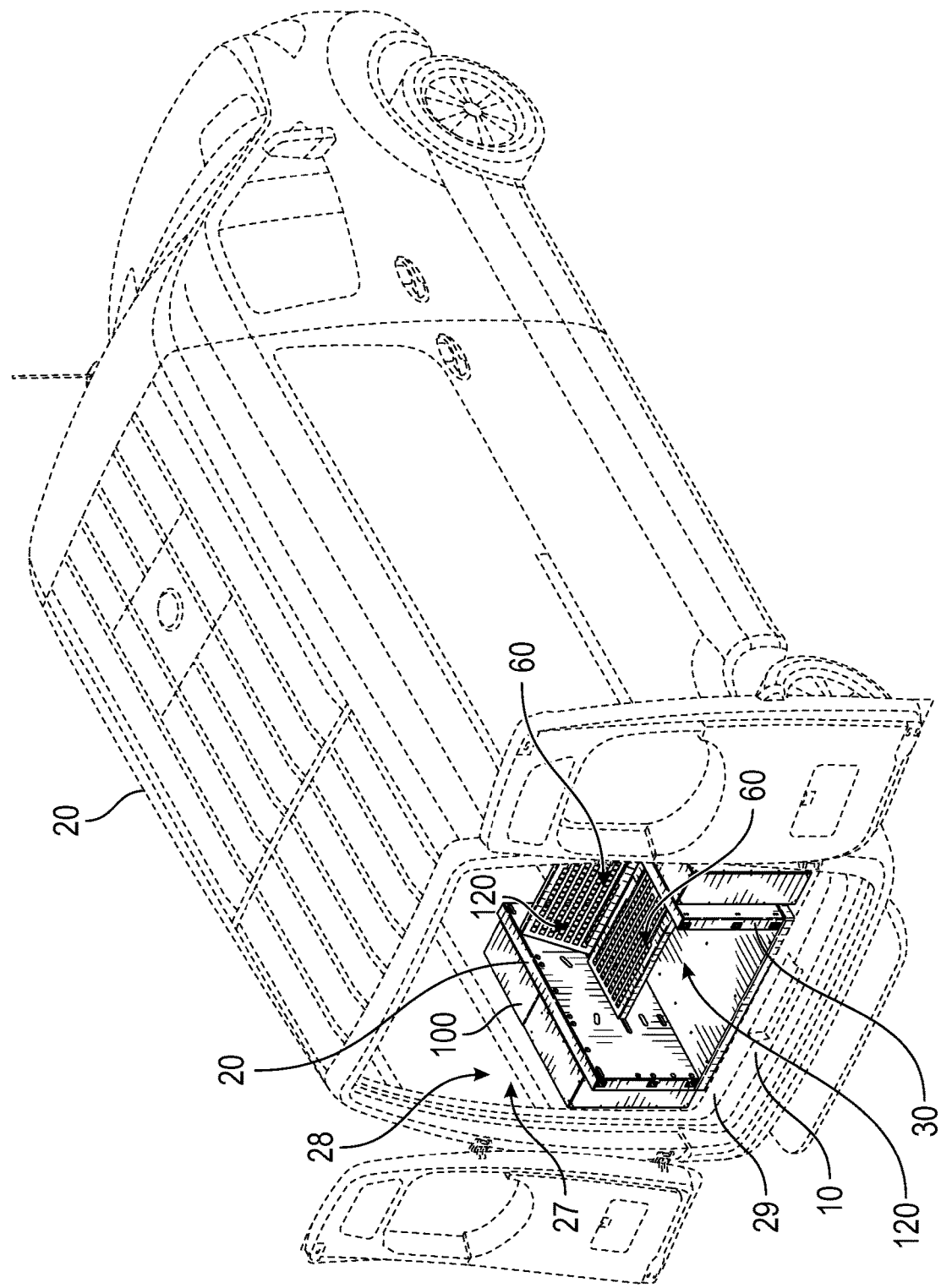
FIG. 1 is a perspective view of the invention as used with a vehicle having a rear cargo area.
Figure 2:
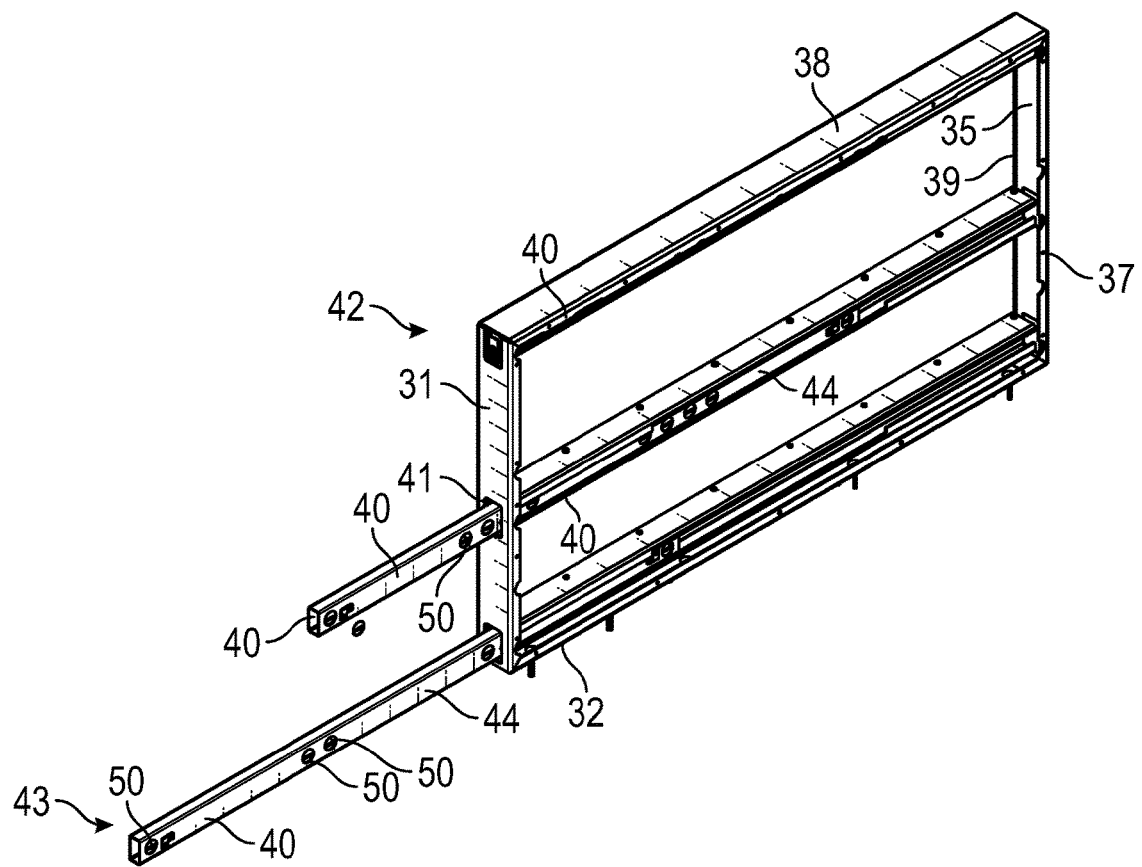
FIG. 2 is a perspective view of a side box of the invention, an inner side and an outer side wall omitted for clarity of illustration.
Figure 3:
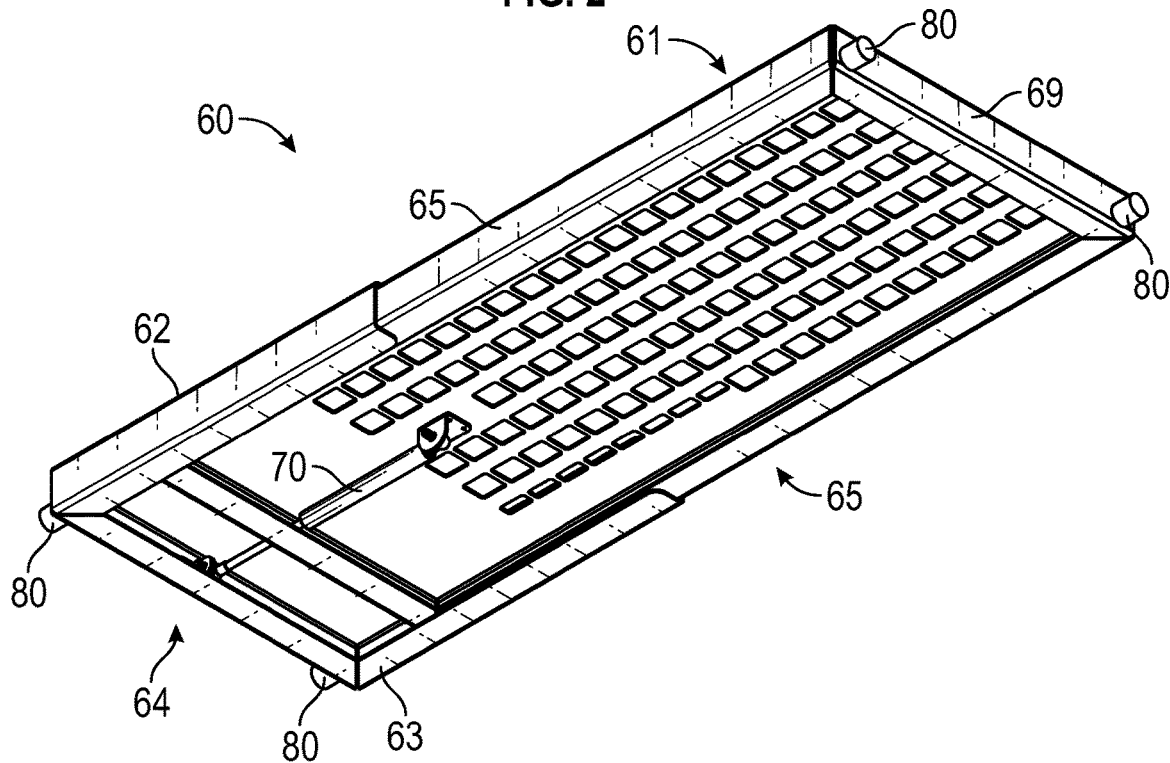
FIG. 3 is a bottom perspective view of a support panel of the invention.
Figure 4:
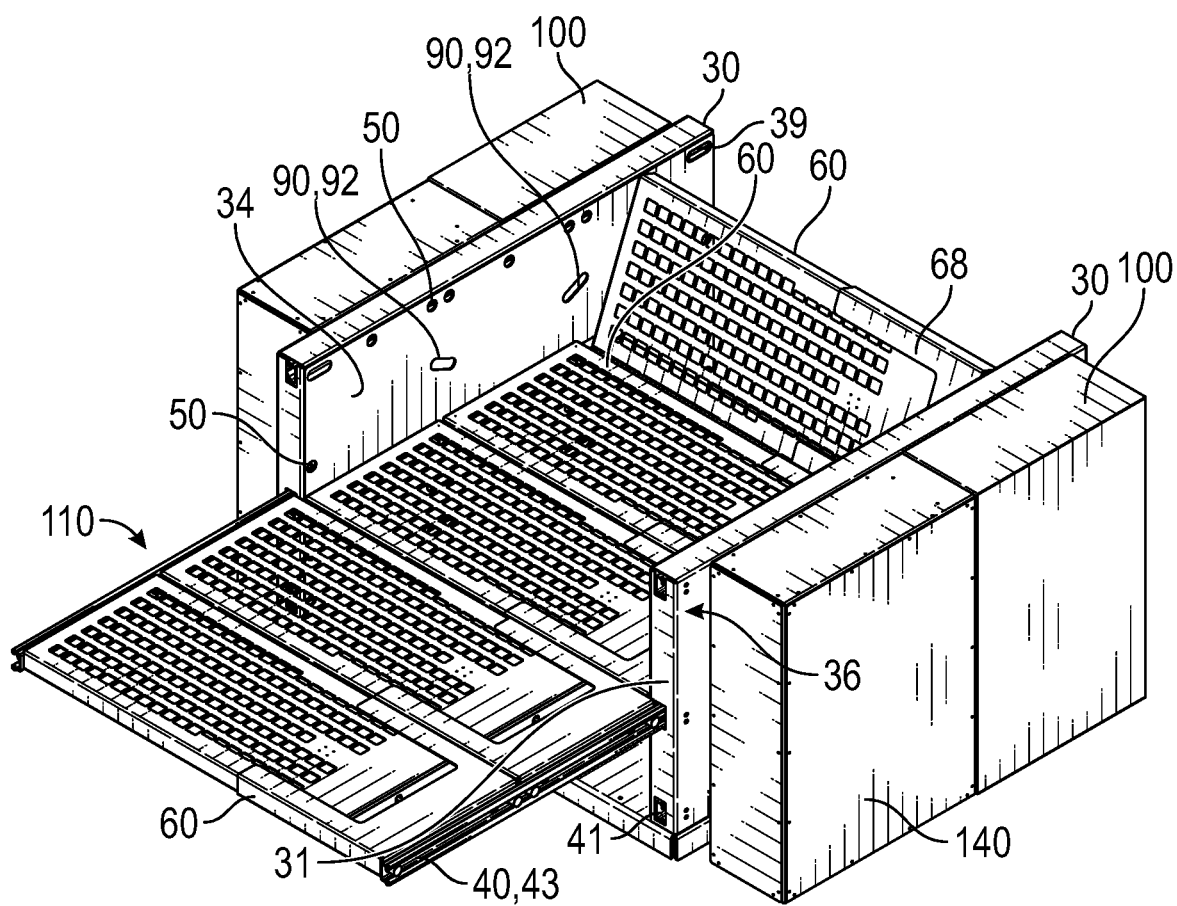
FIG. 4 is a perspective view of the invention illustrated with four of the support panels configured in a horizontal bed configuration.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate a modular bed and seat system 10 for use in a vehicle 20 of the type having a rear cargo area 27 that includes at least two side walls 28 and a floor 29. Such a vehicle 20 may be, for example, a van, station wagon, SUV, or truck.

The modular bed and seat system 10 includes a pair of side boxes 30 that each have a front side 31, a rear side 39, an inner side 34, an outer side 36, a top side 38, and a bottom side 32, all defining an internal volume 35 therein. The front side 31 has at least one extension rail aperture 41. Each side box 30 contains at least one extension rail 40 movable from a retracted position 42 within the internal volume 35 of the side box 30, to an extended position 43 partially extending out of one of the at least one extension rail apertures 41. Each extension rail 40 includes at least two mounting apertures 50 on an inner surface 44 (FIG. 2) thereof. The inner side 34 of each side box 30 also includes at least two of the mounting apertures 50. Preferably each side box 30 is made from a rigid metal material, such as aluminum or stainless steel. The side box 30 may include a rigid metallic frame 37 (FIG. 2) and two side panels that define the inner side 34 and the outer side 36.

The modular bed and seat system 10 further includes a plurality of support panels 60 that each include a first piece 61 telescopingly affixed with a second piece 62. The first piece 61 and the second piece 62, when mutually engaged, form the support panel 60 that includes a top side 68, a bottom side 63, a front side 64, a rear side 69, and two opposing lateral sides 65. Preferably the support panels 60 are made from a rigid metal or plastic material.

A spring mechanism 70 urges the two opposing lateral sides 65 away from each other by urging the first piece 61 away from the second piece 62. Preferably the spring mechanism 70 is a pneumatic cylinder, a coil spring, or the like.

Two rigid mounting prongs 80 project laterally away from each lateral side 656 and are each adapted for engaging one of the mounting apertures 50 on either the inner side 34 of one of the side boxes 30, or the mounting apertures 50 on the inner surface 44 of one of the extension rails 40.

In use, with the side boxes 30 mounted one each to the two side walls 28 of the rear cargo area 27 of the vehicle 20, and with the extension rails 40 set to desired positions, each support panel 60 is compressed to allow the mounting prongs 80 of the support panel 60 to engage with the mounting apertures 50 on either the inner side 34 of one of the side boxes 30 or the mounting apertures 50 on the inner surface 44 of one of the extension rails 40. When released, the spring mechanism 70 urges the mounting prongs 80 into the mounting apertures 50 to secure the support panel 60 to the side boxes 30.

In preferred embodiments the inner side 34 of each side box 30 further includes at least one mounting slot 90 adapted to slidably receive one of the mounting prongs 80 of one of the support panels 60. The mounting slot 90 may be a horizontal mounting slot 91, a slanted mounting slot 92, or a vertical mounting slot (not shown). As such, the position of the support panel 60 with respect to the side boxes 30 is partially adjustable. The mounting apertures 50 of the side boxes 30 may be positioned so that each support panel 60 may be oriented horizontally, or on a slant, or vertically, as may be desired by a user of the system 10.

Preferably the modular bed and seat system 10 further includes at least two tanks 100 adapted for fixing between the outer side 36 of each side box 30 and the rear cargo area 27 of the vehicle 20. Such tanks 100 are adapted for holding a liquid, such as water, and include any necessary manually-actuated spigots, air check valves, and the like as is known in the art. A width of the tanks 100 may be customized so that the modular bed and seat system 10 just fits between the two side walls 28 of the rear cargo area 27.

Figure 5:
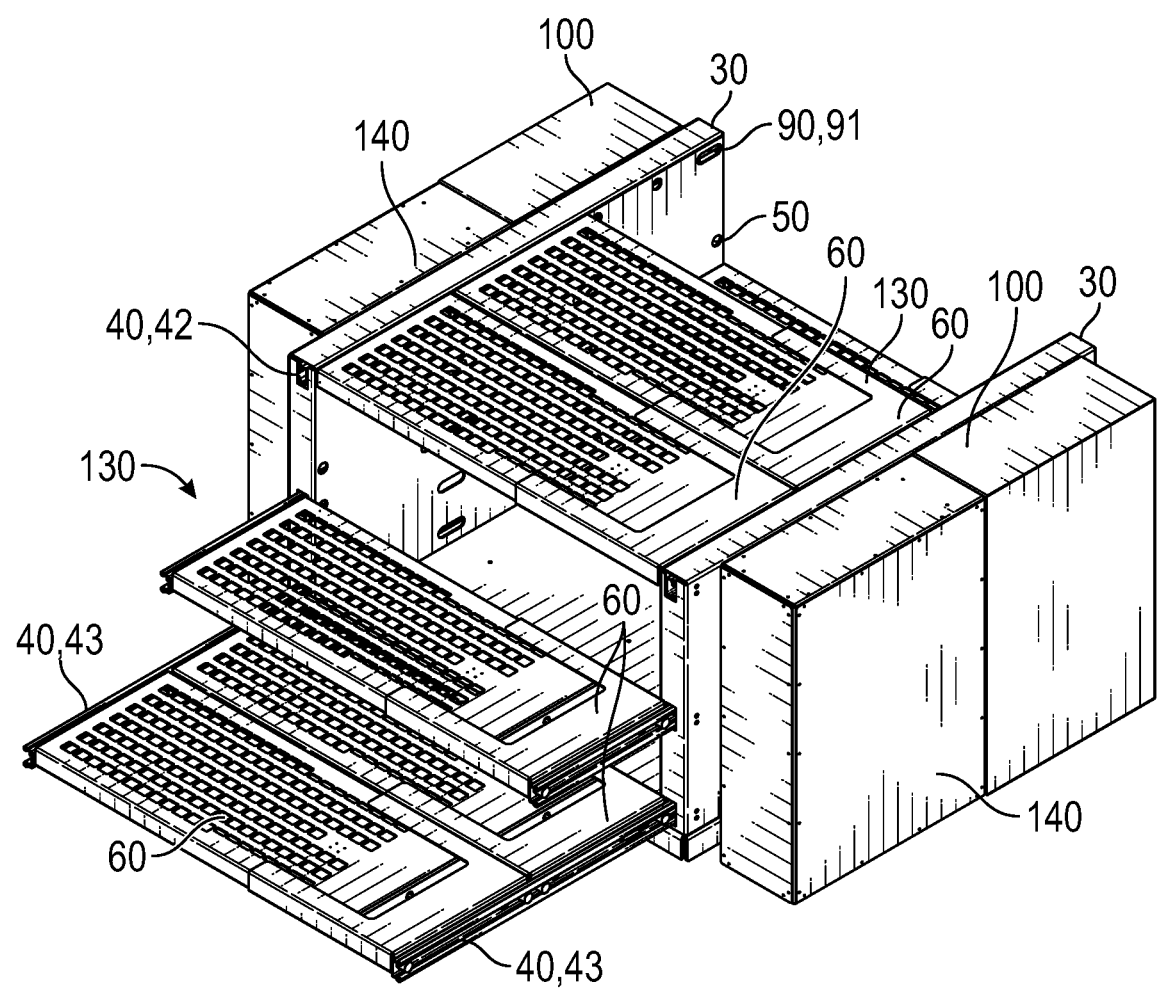
FIG. 5 is a perspective view of the invention illustrated with the support panels configured in a seat and table configuration.
Figure 6:
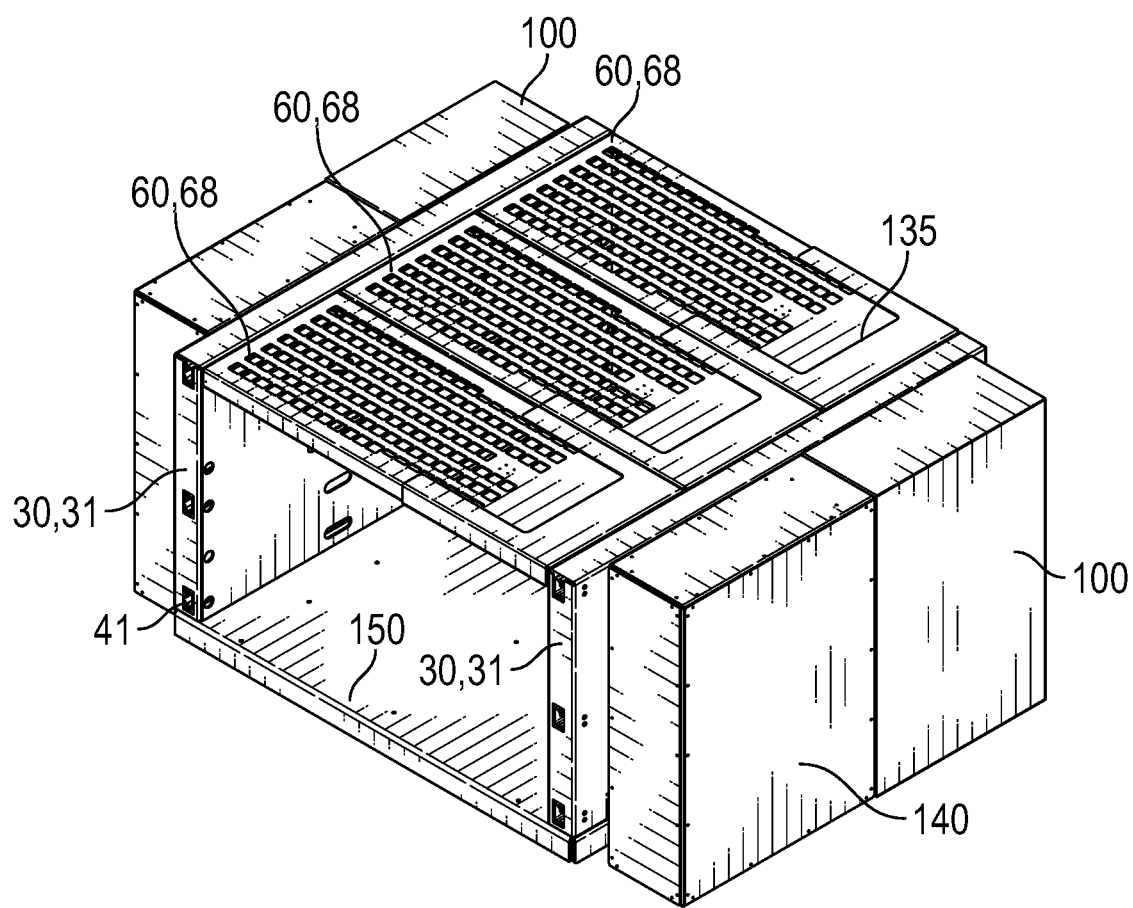
FIG. 6 is a perspective view of the invention illustrated with three of the support panels configured in a horizontal table configuration.

The modular bed and seat system 10 is preferably adapted to allow the plurality of support panels 60 to be configured in a horizontal bed configuration 110 (FIG. 4), a seat with a slanted back configuration 120 (FIG. 1), a table and seat configuration 130 (FIG. 5), a horizontal table configuration 135 (FIG. 6), or numerous other configurations made possible by the extension rails 40 and the side boxes 30 having the mounting apertures 50. Many mounting apertures 50 may be included, resulting in many different possible configurations of the support panels 60.

Figure 7:
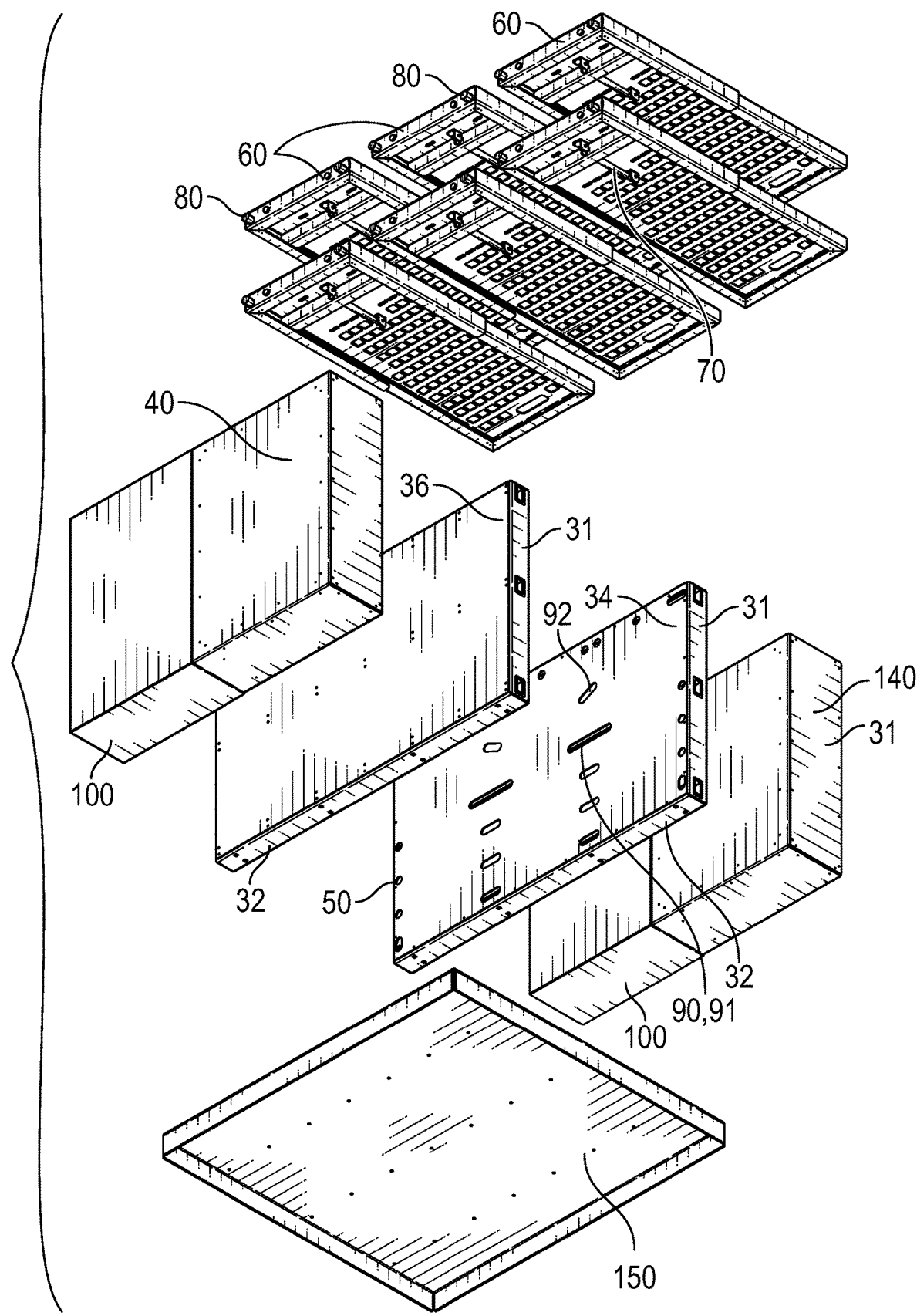
FIG. 7 is a bottom exploded perspective view of the components of the invention.

In some embodiments, build boxes 140 are included as an extension to the water tanks 100, and may be used for storage, as sizing spacers between the two side walls 28 of the rear cargo area 27 and the side boxes 30, and/or include plumbing, pumps, batteries, or other components (not shown) for accessing water stored in the water tanks. Such build boxes 140 may include removable top sides to facilitate access to an internal space within the build boxes 140. Further, a floor panel 150 may be included (FIG. 7) for providing a level support surface for the side boxes 30, the tanks 100, and the build boxes 140.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A modular bed and seat system for use in a vehicle of the type having a rear cargo area defined by at least two side walls and a floor, the modular bed and seat system comprising:

a pair of side boxes each having a front side, a rear side, an inner side, an outer side, a top side, and a bottom side, all defining an internal volume therein, the front side having at least one extension rail aperture, each side box containing at least one extension rail movable from a retracted position within the internal volume of the side box, to an extended position partially extending out of one of the at least one extension rail aperture, each extension rail including at least two mounting apertures on an inner surface thereof, the inner side of each side box also including at least two of the mounting apertures; and a plurality of support panels each including a first piece telescopingly affixed with a second piece, the first piece and second piece when mutually engaged forming the support panel having a top side, a bottom side, a front side, a rear side, and two opposing lateral sides, a spring mechanism urging the two opposing lateral sides away from each other, two mounting prongs projecting laterally away from each lateral side and adapted for engaging two of the mounting apertures on either the inner side of one of the side boxes or the mounting apertures on the inner surface of one of the extension rails;

whereby with the side boxes mounted one each to the two side walls of the rear cargo area of the vehicle and with the extension rails set to desired positions, each support panel is compressed to allow the mounting prongs of the support panel to engage with the mounting apertures on either the inner side of one of the side boxes or the mounting apertures on the inner surface of one of the extension rails.

2. The modular bed and seat system of claim 1 wherein the inner side of each side box further includes at least one mounting slot.

3. The modular bed and seat system of claim 2 wherein the at least one mounting slot is horizontal.

4. The modular bed and seat system of claim 2 wherein the at least one mounting slot is slanted with respect to the top side of the side box.

5. The modular bed and seat system of claim 1 further including a pair of tanks adapted for fixing between the outer side of each side box and the rear cargo area of the vehicle, each tank adapted for holding a liquid.

6. The modular bed and seat system of claim 1 wherein the support panels can be arranged with the extension rails in the extended position to form a horizontal bed.

7. The modular bed and seat system of claim 4 wherein the support panels can be arranged to form a seat with a slanted back support panel.

8. The modular bed and seat system of claim 4 wherein the support panels can be arranged to form a seat with a slanted back support panel and a table support surface.

* * * * *